(12) United States Patent
Miyamoto et al.

(10) Patent No.: US 9,578,906 B2
(45) Date of Patent: Feb. 28, 2017

(54) METHOD OF PRODUCING ELASTIC GLOVE

(71) Applicant: SUMITOMO RUBBER INDUSTRIES, LTD., Hyogo (JP)

(72) Inventors: Yoshiaki Miyamoto, Hyogo (JP); Noryani Taib, Kedah (MY); Pei Szu Lean, Kedah (MY); Atsushi Takai, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 239 days.

(21) Appl. No.: 14/401,121

(22) PCT Filed: Feb. 15, 2013

(86) PCT No.: PCT/JP2013/053757
§ 371 (c)(1),
(2) Date: Nov. 14, 2014

(87) PCT Pub. No.: WO2013/172063
PCT Pub. Date: Nov. 21, 2013

(65) Prior Publication Data
US 2015/0102522 A1    Apr. 16, 2015

(30) Foreign Application Priority Data
May 18, 2012 (MY) .............................. PI2012002235

(51) Int. Cl.
| | | |
|---|---|---|
| *B29C 41/20* | (2006.01) | |
| *A41D 19/015* | (2006.01) | |
| *B29C 41/42* | (2006.01) | |
| *B29D 99/00* | (2010.01) | |
| *B29C 41/14* | (2006.01) | |
| *A41D 19/00* | (2006.01) | |
| *B05D 1/16* | (2006.01) | |
| *B29K 7/00* | (2006.01) | |
| *B29L 31/48* | (2006.01) | |

(52) U.S. Cl.
CPC ............ *A41D 19/015* (2013.01); *B29C 41/14* (2013.01); *B29C 41/20* (2013.01); *B29C 41/42* (2013.01); *B29D 99/0067* (2013.01); *A41D 19/0058* (2013.01); *B05D 1/16* (2013.01); *B29K 2007/00* (2013.01); *B29L 2031/4864* (2013.01)

(58) Field of Classification Search
None
See application file for complete search history.

(56) References Cited

U.S. PATENT DOCUMENTS

| | | | | |
|---|---|---|---|---|
| 2,120,722 A | * | 6/1938 | Tillotson | B29D 99/0067 2/168 |
| 2,126,809 A | * | 8/1938 | Beach | D01C 1/02 8/101 |
| 2,252,999 A | * | 8/1941 | Wallach | D02G 3/402 156/305 |
| 2,273,995 A | * | 2/1942 | Rogerson | B29D 99/0067 2/167 |
| 2,277,788 A | * | 3/1942 | Harrel | C08F 263/04 106/271 |
| 2,323,387 A | * | 7/1943 | Edelstein | D06M 13/02 427/343 |
| 2,873,450 A | * | 2/1959 | Brodeur, Jr. | A41D 19/0055 2/167 |
| 4,536,890 A | * | 8/1985 | Barnett | A41D 19/0062 2/161.6 |
| 4,757,557 A | * | 7/1988 | Hirano | A41D 19/0055 2/164 |
| 7,383,590 B1 | | 6/2008 | Duncan | |
| 2002/0152560 A1 | * | 10/2002 | Soane | C08B 3/10 8/494 |
| 2005/0183186 A1 | | 8/2005 | Hanada et al. | |
| 2007/0149075 A1 | * | 6/2007 | O'Rear | C09D 4/00 442/88 |

FOREIGN PATENT DOCUMENTS

| | | |
|---|---|---|
| CN | 101632494 | 1/2010 |
| CN | 102641004 | 8/2012 |
| JP | 06002204 | * 1/1994 |
| JP | H07-278925 | 10/1995 |
| JP | H08-158124 | 6/1996 |
| JP | 2000-210102 | 8/2000 |
| JP | 2001329409 | * 11/2001 |
| JP | 2004-027445 | 1/2004 |
| JP | 2004-027449 | 1/2004 |
| KR | 101279108 | 6/2013 |

OTHER PUBLICATIONS

"International Preliminary Report on Patentability of PCT application"; this report contains the following items :Form PCT/IB/373, PCT/ISA237(cover sheet), PCT/ISA237(Box No. I),PCT/ISA237(Box No. V), mailed on Nov. 18, 2014, which is English translation of "Written Opinion of the International Searching Authority", p. 1-p. 8.

"International Search Report (Form PCT/ISA/210) of PCT application", mailed on May 7, 2013, with English translation thereof, p. 1-p. 3 in which the listed references (JP2004-027445, JP2004-027449 and JP2000-210102) were cited.

* cited by examiner

Primary Examiner — Edmund Lee
(74) Attorney, Agent, or Firm — Jianq Chyun IP Office

(57) ABSTRACT

In producing an elastic glove made of rubber or resin and having an interior surface flocked with piles through a step for depositing the piles on a film of a latex composition formed on a surface of a mold conformal to a three-dimensional shape of the elastic glove, a water repellent/hydrophilic pile mixture containing water repellent piles in a proportion of 10 to 80 mass % is used as the piles to uniformize a pile embedded state in a rubber or resin film defining the interior surface over the substantially entire surface of the elastic glove.

3 Claims, No Drawings

METHOD OF PRODUCING ELASTIC GLOVE

CROSS-REFERENCE TO RELATED APPLICATIONS

This application is a 371 application of an international PCT application serial no. PCT/JP2013/053757, filed on Feb. 15, 2013, which claims the priority benefit of Malaysia Patent Application No. PI2012002235, filed on May 18, 2012. The entirety of each of the above-mentioned patent applications is hereby incorporated by reference herein and made a part of this specification.

TECHNICAL FIELD

The present invention relates to a method of producing an elastic glove entirely made of rubber or resin and having an interior surface flocked with a multiplicity of piles.

BACKGROUND ART

Elastic gloves each entirely unitarily made of rubber or resin are widely used at homes, in plants and in medical facilities to protect skin of human hands, to prevent food poisoning and infectious diseases and/or to protect objects to be handled (e.g., semiconductor devices and precision instruments) from sebum of human hands. It is noted that not only gloves made of rubber but also gloves made of resin are generally referred to as "elastic gloves" and, therefore, these gloves are collectively referred to as "elastic gloves" in the present invention regardless of whether the gloves are made of rubber or resin.

One of known types of elastic gloves is such that the generally entire interior surface of the elastic glove (ranging from a fingertip portion to a cuff portion of the elastic glove) is flocked with a multiplicity of short-fibers (piles) such as of cotton or rayon to facilitate attachment and detachment of the elastic glove to/from a hand and to improve the texture of the interior surface when the glove is worn on the hand.

The elastic glove is generally produced by a so-called dipping method.

For production of an elastic glove entirely unitarily made of rubber and having an interior surface flocked with piles, for example, an unvulcanized or prevulcanized liquid latex composition is first prepared by blending various additives such as a vulcanizing agent to a rubber latex. Further, a ceramic mold conformal to the three-dimensional shape of the elastic glove is prepared, and its surface is treated with a coagulant (mainly a calcium nitrate aqueous solution).

Subsequently, the mold is held with its fingertip side down and with its cuff side up, and dipped, its fingertip side first, into the latex composition. Then, the mold is taken out, its cuff side first, from the latex composition. Thus, the latex composition adheres to the surface of the mold to form a latex composition film.

In turn, piles are deposited on the film by either or both of a spraying process or an electrostatic deposition process, and then the film is heated together with the mold for drying the latex composition and vulcanizing the rubber. Alternatively, the film is first dried, and then heated together with the mold for the vulcanization of the rubber.

Thus, portions of the individual piles adhering to the film are embedded in the vulcanized film to be fixed to the film, and remaining portions of the individual piles are exposed from the film. That is, the piles are flocked on a surface of the film later serving as the interior surface of the glove.

Thereafter, the elastic glove is turned inside out to be demolded or, alternatively, the elastic glove is demolded and then turned inside out, so that the surface of the film flocked with the piles defines the interior surface of the elastic glove. Thus, the elastic glove is produced, which is entirely unitarily made of the rubber and has the interior surface flocked with the piles.

The elastic glove may have a double layer structure including an outer layer defining an exterior surface thereof and an inner layer defining the interior surface thereof flocked with the piles.

The elastic glove of the double layer structure is produced by dipping a mold into a latex composition as a material for the outer layer, taking out the mold to form a film, dipping the resulting mold into a latex composition as a material for the inner layer to form a film, depositing piles on a surface of the film, and entirely vulcanizing the rubber in the films (see, for example, Patent Document 1).

An elastic glove entirely and unitarily made of a resin is produced in substantially the same manner as described above, except that a latex composition prepared by blending various additives in a resin emulsion is used instead of the latex composition containing the rubber latex. In strict sense, the composition containing the resin emulsion is not a latex composition. However, the composition containing the resin emulsion as well as the latex composition containing the rubber latex are herein referred to as "latex composition" for convenience.

It is known that, in the dipping process, the amount of the latex composition adhering to the mold surface, i.e., the thickness of the film, is increased as the period during which the mold is dipped in the latex composition is increased.

Therefore, where the mold is dipped, its fingertip side first, in the latex composition and then taken out, its cuff side first, from the latex composition as described above, the fingertip side of the mold is dipped in the latex composition for a longer period of time than the cuff side of the mold. Thus, the latex composition is liable to adhere in a greater amount on the fingertip side than on the cuff side, so that the thickness of the film tends to be greater on the fingertip side than on the cuff side.

Further, the drying speed of the latex composition tends to be increased as the thickness of the film is reduced. Conversely, the drying speed of the latex composition tends to be reduced as the thickness of the film is increased.

Particularly, where the films of the latex compositions are stacked one on the other for the production of the elastic glove of the double layer structure, these tendencies are enhanced.

Therefore, even if the piles are substantially simultaneously deposited uniformly over the entire surface of the film of the latex composition formed on the generally entire surface of the mold, the individual piles are liable to be embedded in the film in different pile embedded states on the fingertip side and on the cuff side.

That is, if the period required to dry the film is increased, the individual piles deposited on the film tend to be embedded to a greater extent in the film.

Accordingly, a greater number of piles are embedded to a greater extent in the film on the fingertip side where the film has a greater thickness and hence is more slowly dried.

On the fingertip side, therefore, the piles which are harder than the rubber and the resin are embedded to a greater extent in the film. This reduces the flexibility of the film, and gives a rough touch on the interior surface of the elastic glove, deteriorating the texture of the interior surface of the elastic glove.

On the cuff side where the film has a smaller thickness and hence is quickly dried, on the other hand, the piles are embedded to a smaller extent in the film, so that a greater number of piles are liable to fall out of the vulcanized film.

Therefore, the number of piles falling out of the film is increased on the cuff side. This reduces the effect of facilitating the attachment and the detachment of the elastic glove to/from the hand and improving the texture of the interior surface of the elastic glove by the pile flocking.

PRIOR ART DOCUMENTS

Patent Documents

Patent Document 1: JP-2004-27445-A

SUMMARY OF THE INVENTION

Problem to be Solved by the Invention

It is an object of the present invention to provide a method of producing an elastic glove having an interior surface which is imparted with a particularly comfortable texture by embedding piles in a film in a pile embedded state uniformized as much as possible over the entire interior surface and is substantially free from the above problems which may otherwise occur due to variations in the pile embedded state.

Means for Solving the Problem

Conventionally used as the piles are hydrophilic piles such as made of cotton and not subjected to a water repellent treatment process for higher affinity for an aqueous latex composition.

If these hydrophilic piles are used alone, however, the pile embedded state significantly varies due to variations in the film drying speed based on the thickness of the film of the latex composition. This causes the problems described above.

The inventor of the present invention conducted studies to replace some of the hydrophilic piles with water repellent piles obtained by treatment with stearic acid, calcium stearate, wax, silicone resin or the like.

The water repellent piles are different in affinity (have lower affinity) for the aqueous latex composition than the hydrophilic piles. Therefore, the relationship between the drying speed of the film of the latex composition and the pile embedded state for the water repellent piles is significantly different from that for the hydrophilic piles.

Therefore, the inventor considered that the pile embedded state could be uniformized as much as possible over the substantially entire interior surface of the elastic glove by using proper proportions of the water repellent piles and the hydrophilic piles in combination.

The inventor further conducted studies to find the optimum blend ratio between the water repellent piles and the hydrophilic piles to provide the effects described above and, as a result, attained the present invention.

According to the present invention, there is provided a method of producing an elastic glove entirely made of rubber or resin and having an interior surface flocked with a multiplicity of piles, the method comprising the steps of: dipping a mold conformal to the three-dimensional shape of the elastic glove into an aqueous liquid latex composition containing the rubber or the resin, and taking out the mold to form a film of the latex composition defining at least the interior surface of the elastic glove on a surface of the mold; and depositing the piles on the film and then vulcanizing the rubber contained in the latex composition or curing or solidifying the resin contained in the latex composition;

wherein hydrophilic piles and water repellent piles are used in combination as the piles, and the water repellent piles are present in a proportion of not less than 10 mass % and not greater than 80 mass % based on the total amount of the hydrophilic piles and the water repellent piles.

In the present invention, the proportion of the water repellent piles is limited to the aforementioned range. If the proportion of the water repellent piles falls outside the aforementioned range, it is impossible to provide the aforementioned effects by the combinational use of the hydrophilic piles and the water repellent piles, as will become apparent from the results in Examples and Comparative Examples to be described later.

In order to further improve the aforementioned effects by the combinational use of the two types of piles, the proportion of the water repellent piles based on the total amount of the two types of piles is preferably not less than 20 mass % and not greater than 50 mass % in the aforementioned range.

In the present invention, the hydrophilic piles are defined as piles having a sedimentation period of not longer than 5 minutes which is a period required for 1.5 g of piles preliminarily weighed and calmly put on a surface of 1.8 L of pure water filled in a 2 L beaker to entirely sediment in the water at a temperature of 23° C. at a relative humidity of 50%. The water repellent piles are defined as entire piles continuously floating on the surface of the water for 24 hours or longer under the same conditions as described above without sedimentation in the water.

As in the prior art, the elastic glove to be produced by the inventive production method may have a double layer structure including an outer layer defining an exterior surface of the elastic glove, and an inner layer defining the interior surface flocked with the piles.

For the production of the elastic glove of the double layer structure, the mold is dipped in a liquid latex composition containing rubber or resin, and then taken out to form a film of the latex composition defining the exterior surface of the elastic glove on the surface of the mold before the formation of the film defining the interior surface of the elastic glove.

Effect of the Invention

According to the present invention, it is possible to provide a method of producing an elastic glove having an interior surface which is imparted with a particularly comfortable texture by embedding piles in a film in a pile embedded state uniformized as much as possible over the entire interior surface and is substantially free from the above problems which may otherwise occur due to variations in the pile embedded state.

Mode for Carrying Out the Invention

An inventive method of producing an elastic glove includes the steps of: dipping a mold conformal to the three-dimensional shape of the elastic glove into an aqueous liquid latex composition containing rubber or resin, and taking out the mold to form a film of the latex composition defining at least an interior surface of the elastic glove on a surface of the mold; and depositing piles on the film and then vulcanizing the rubber contained in the latex composition or curing or solidifying the resin contained in the latex composition.

Hydrophilic piles and water repellent piles are used in combination as the piles, and the water repellent piles are present in a proportion of not less than 10 mass % and not greater than 80 mass % based on the total amount of the hydrophilic piles and the water repellent piles, whereby the pile embedded state is uniformized as much as possible over the substantially entire interior surface of the elastic glove. This suppresses the various problems which may otherwise occur due to variations in pile embedded state.

In order to further improve the aforementioned effects by the combinational use of the two types of piles, the proportion of the water repellent piles based on the total amount of the hydrophilic piles and the water repellent piles is preferably not less than 20 mass % and not greater than 50 mass % in the aforementioned range.

Usable examples of the hydrophilic piles include various types of hydrophilic piles which satisfy a condition that the sedimentation period required for 1.5 g of piles preliminarily weighed and calmly put on a surface of 1.8 L of pure water filled in a 2 L beaker to entirely sediment in the water at a temperature of 23° C. at a relative humidity of 50% is not longer than 5 minutes as described above.

A specific example of the hydrophilic piles is cotton piles not subjected to a water repellent treatment process or the like. The hydrophilic cotton piles are produced, for example, by spinning cotton fibers obtained from raw cotton to form cotton thread and then cutting the cotton thread or by cutting recycled cotton garments, cotton towels and the like.

Usable examples of the water repellent piles include various types of water repellent piles which satisfy a condition that 1.5 g of piles preliminarily weighed and calmly put on a surface of 1.8 L of pure water filled in a 2 L beaker entirely continuously float on the surface of the water for 24 hours or longer at a temperature of 23° C. at a relative humidity of 50% without sedimentation in the water.

Specific examples of the water repellent piles include water repellent piles obtained, for example, by treating the hydrophilic piles described above with stearic acid, calcium stearate, wax, a silicone resin or the like as described above.

The hydrophilic piles and the water repellent piles preferably each have a fiber length of not less than 0.2 mm and not greater than 0.8 mm in order to facilitate attachment and detachment of the elastic glove to/from a hand and more effectively improve the texture of the interior surface of the elastic glove by flocking the interior surface of the elastic glove with the piles.

The inventive production method is performed in substantially the same manner as the prior art production method, except that the aforementioned proportions of the two types of piles are used in combination.

For example, the elastic glove of the double layer structure including the outer layer (often referred to as "color layer" because it is generally colored) defining the exterior surface thereof and the inner layer (functions as "adhesive layer" to bond the piles) defining the interior surface thereof flocked with the piles as described above is generally produced in the following manner.

First, a mold such as of ceramic or a metal conformal to the three-dimensional shape of the elastic glove is prepared, and the generally entire surface of the mold is treated with a coagulant (mainly a calcium nitrate aqueous solution). Further, latex compositions were prepared as materials for the outer layer and the inner layer.

Then, the mold is dipped in the outer layer latex composition for a predetermined period, and taken out. Thus, a film of the outer layer latex composition is formed on the mold surface.

Subsequently, the mold formed with the film is dipped in the inner layer latex composition for a predetermined period, and then taken out. Thus, a film of the inner layer latex composition is formed on the film previously formed on the mold surface.

It is preferred to once dry the film of the outer layer latex composition previously formed on the mold surface, and then apply the inner layer latex composition.

This prevents the inner layer latex composition and the outer layer latex composition from being comingled with each other more than necessary to impart the outer layer and the inner layer with discrete functions, while ensuring proper adhesion between the inner layer and the outer layer for unification of the inner and outer layers.

In turn, the hydrophilic piles and the water repellent piles are deposited in a mixed state on the film of the inner layer latex composition by either or both of the spraying process and the electrostatic deposition process.

The amount of the piles to be deposited is not particularly limited, but is preferably not less than 1.5 mg/cm$^2$ and not greater than 1.8 mg/cm$^2$.

Where the latex composition contains the rubber, as required, a gel-leaching treatment is carried out with warm water, and then the latex composition is heated together with the mold for drying the latex composition and vulcanizing the rubber or, alternatively, the latex composition is once dried and heated together with the mold for vulcanizing the rubber.

Where the latex composition contains a thermosetting resin, the latex composition is heated together with the mold for drying the latex composition and curing the resin or, alternatively, the latex composition is once dried and heated together with the mold for curing the resin.

Where the latex composition contains a thermoplastic resin, the latex composition is heated together with the mold for drying the latex composition and melting the resin and then cooled together with the mold for solidifying the resin or, alternatively, the latex composition is once dried, heated together with the mold for melting the resin and cooled for solidifying the resin.

Thereafter, the elastic glove is turned inside out to be demolded so that the surface of the film flocked with the piles defines the interior surface of the elastic glove. Alternatively, the elastic glove is demolded and then turned inside out. Thus, the elastic glove is produced, which is entirely unitarily made of the rubber or the resin and having the interior surface flocked with the piles.

The thicknesses of the inner layer and the outer layer are properly determined according to the use purpose of the elastic glove.

For the proper adhesion between the inner and outer layers and the unification of the inner and outer layers, latex compositions containing the same rubber or resin or latex compositions containing different rubbers or resins compatible with each other or having affinity for each other are used in combination as the latex compositions for the inner layer and the outer layer.

The inner layer latex composition and the outer layer latex composition basically have substantially the same formulation though different rubbers or resins may be selected. However, a colorant may be blended in the outer layer latex composition for coloring the outer layer as desired. No colorant is basically blended in the inner layer latex composition, but the inner layer latex composition generally has the same color as the rubber or the resin. A desired colorant may be added to the inner layer latex composition to impart the inner layer latex composition with the same color as the outer layer latex composition or a different color.

As in the prior art, the rubber-containing latex compositions for the inner and outer layers are each prepared by blending various additives such as a vulcanizing agent in the rubber latex and, as required, performing pre-vulcanization.

A variety of rubbers including natural rubbers and synthetic rubbers which can be made latexes are usable as the rubber. Examples of such rubbers include natural rubbers, deproteinized natural rubbers, acrylonitrile-butadiene rubbers (NBR), styrene-butadiene rubbers (SBR) and chloroprene rubbers (CR), which may be used either alone or in combination.

Examples of the vulcanizing agent include sulfur and organic sulfur-containing compounds. Particularly, sulfur is preferred. The proportion of the vulcanizing agent is preferably not less than 0.5 parts by mass and not greater than 3 parts by mass based on 100 parts by mass of a rubber component (solid component) in the rubber latex.

Any of various additives such as a vulcanization accelerating agent, a heat stabilizer, a vulcanization acceleration assisting agent, an anti-aging agent, a filler, a surfactant, a tackifier, a foaming agent, a plasticizer, a pH adjusting agent and the aforementioned colorant may be blended in the latex composition containing the rubber and the vulcanizing agent.

Examples of the vulcanization accelerating agent include zinc N-ethyl-N-phenyldithiocarbamate (generally referred to as PX), zinc dimethyldithiocarbamate (PZ), zinc diethyldithiocarbamate (EZ), zinc dibutyldithiocarbamate (BZ), zinc 2-mercaptobenzothiazole (MZ) and tetramethylthiuram disulfide (TT), which may be used either alone or in combination.

The proportion of the vulcanization accelerating agent is preferably not less than 0.5 parts by mass and not greater than 3 parts by mass based on 100 parts by mass of the rubber component (solid component) in the rubber latex.

Examples of the vulcanization acceleration assisting agent include zinc white (zinc oxide) and stearic acid. The proportion of the vulcanization acceleration assisting agent is preferably not less than 0.5 parts by mass and not greater than 3 parts by mass based on 100 parts by mass of the rubber component (solid component) in the rubber latex.

In general, non-staining phenols are preferably used as the anti-aging agent, and amines are also usable. The proportion of the anti-aging agent is preferably not less than 0.5 parts by mass and not greater than 3 parts by mass based on 100 parts by mass of the rubber component (solid component) in the rubber latex.

Examples of the filler include kaolin clay, hard clay, calcium carbonate and titanium oxide, which may be used either alone or in combination. The proportion of the filler is preferably not less than 1 part by mass and not greater than 10 parts by mass based on 100 parts by mass of the rubber component (solid component) in the rubber latex.

The surfactant is blended for properly dispersing any of the additives in the rubber latex. Examples of the surfactant include anionic surfactants such as potassium oleate, which may be used either alone or in combination. The proportion of the surfactant is preferably not less than 0.3 parts by mass and not greater than 1 part by mass based on 100 parts by mass of the rubber component (solid component) in the rubber latex.

The tackifier is blended for adjusting the viscosity of the latex composition. Examples of the tackifier include water soluble resins such as hydroxymethylcellulose. The proportion of the tackifier is properly determined according to the target viscosity of the latex composition.

The pH adjusting agent is blended for adjusting the pH of the latex composition. Examples of the pH adjusting agent include caustic alkalis such as potassium hydroxide and sodium hydroxide. The proportion of the pH adjusting agent is properly determined according to the target pH of the latex composition.

Examples of the colorant include pigments and dyes, which may be used either alone or in combination. The proportion of the colorant may be properly determined according to the color density of the outer layer or the inner layer to be colored.

The resin-containing latex compositions for the inner layer and/or the outer layer are prepared by blending any of the various additives in an emulsion of the resin as in the prior art.

Examples of the resin include emulsifiable thermoplastic resins such as vinyl chloride resins, and emulsifiable thermosetting resins such as urethane resins and curable acryl resins, which may be used either alone or in combination.

Any of various additives such as a heat stabilizer, an anti-aging agent, a filler, a surfactant, a tackifier, a foaming agent, a plasticizer and the aforementioned colorant may be blended in the resin-containing latex composition.

Examples of the anti-aging agent include non-staining phenols and amines described above, which may be used either alone or in combination. The proportion of the anti-aging agent is preferably not less than 0.5 parts by mass and not greater than 3 parts by mass based on 100 parts by mass of the resin component (solid component) in the resin emulsion.

Examples of the filler include fillers previously described, which may be used either alone or in combination. The proportion of the filler is preferably not less than 1 part by mass and not greater than 10 parts by mass based on 100 parts by mass of the resin component (solid component) in the resin emulsion.

Examples of the surfactant include anionic surfactants described above, which may be used either alone or in combination. The proportion of the surfactant is preferably not less than 0.3 parts by mass and not greater than 1 part by mass based on 100 parts by mass of the resin component (solid component) in the resin emulsion.

Examples of the colorant include pigments and dyes, which may be used either alone or in combination. The proportion of the colorant may be properly determined according to the color density of the outer layer or the inner layer to be colored.

A crosslinking agent, a curing agent and the like for curing the urethane resin or the like may be blended in proper proportions in the latex composition.

Where an elastic glove of a single layer structure is produced by the inventive production method, the outer layer forming step is obviated.

Further, an elastic glove having a layered structure including three or more layers (e.g., an outer layer, an intermediate layer and an inner layer) may be produced by the inventive production method. In this case, the dipping step is repeated a predetermined number of times which is equal to the number of the layers.

The formation of the outer layer and the intermediate layer on the surface of the mold may be achieved by a given coating method such as a spraying method rather than by the dipping method.

Alternatively, a given coating method such as the spraying method may be used to form the intermediate layer and the outer layer on the exterior surface of the elastic glove of the single layer structure produced by the inventive production method.

Modifications may be made to the embodiments described above without departing from the spirit and scope of the present invention.

EXAMPLES

Preparation of Inner Layer Latex Composition

After ingredients shown below in Table 1 were blended in a natural rubber latex and the resulting rubber latex was matured for two days, soft water was added to the rubber latex to adjust the solid concentration at 57 mass %. Thus, a latex composition for an inner layer (formulation for an adhesive layer) was prepared. The amounts (parts by mass) of the respective ingredients shown in Table 1 are based on 100 parts by mass of the rubber component (solid component) in the natural rubber latex. The inner layer latex composition had a pH of 10.5 and a TSC of 57.

TABLE 1

| Ingredients | Parts by mass |
| --- | --- |
| Potassium oleate | 0.3 |
| Potassium hydroxide | 0.4 |
| Sulfur | 1 |
| Zinc diethyldithiocarbamate | 1 |
| Zinc oxide | 0.5 |

Preparation of Outer Layer Latex Composition

After ingredients shown below in Table 2 were blended in a natural rubber latex and the resulting rubber latex was matured for two days, soft water was added to the rubber latex to adjust the solid concentration at 54 mass %. Thus, a latex composition for an outer layer (formulation for a color layer) was prepared. The amounts (parts by mass) of the respective ingredients shown in Table 2 are based on 100 parts by mass of the rubber component (solid component) in the natural rubber latex. The outer layer latex composition had a pH of 11, a TSC of 54 and a viscosity of 250 Pa·s.

TABLE 2

| Ingredients | Parts by mass |
| --- | --- |
| Potassium oleate | 0.3 |
| Potassium hydroxide | 0.5 |
| Sulfur | 1 |
| Zinc diethyldithiocarbamate | 1 |
| Zinc oxide | 0.5 |
| Hydroxymethylcellulose | 0.25 |

<Piles>

Untreated cotton piles (having an average fiber length of 0.5 mm) were prepared as hydrophilic piles. The pile sedimentation period of the hydrophilic piles was measured by the aforementioned method. As a result, the hydrophilic piles were entirely sedimented in the water in 2 minutes.

Cotton piles having an average fiber length of 0.5 mm and treated with silicone resin were prepared as water repellent piles. The pile sedimentation period was measured by the aforementioned method. As a result, the water repellent piles were entirely continuously floated on a water surface for 24 hours or longer without sedimentation in the water.

Example 1

Piles

The hydrophilic piles H and the water repellent piles O were mixed together in a mass ratio of O/H=10/90, so that the water repellent piles were present in a proportion of 10 mass % based on the total amount of the hydrophilic piles and the water repellent piles. Thus, mixed piles were prepared.

(Production of Glove)

A mold entirely made of ceramic and conformal to the three-dimensional shape of the elastic glove was prepared.

The mold was first dipped in an aqueous solution of 18% calcium nitrate, then taken out, and dried. Thus, the surface of the mold was treated with calcium nitrate (coagulant).

In turn, the mold was dipped, its fingertip side first, at a rate of 3 cm/s into the outer layer latex composition kept at a liquid temperature of 25° C. to a depth of 33 cm measured from a fingertip portion to a cuff portion of the mold, then kept in a dipped state for 12 seconds, and taken out, its cuff side first, at a rate of 2 cm/s, whereby a film of the outer layer latex composition was formed on the surface of the mold. Thereafter, the film was dried at a room temperature for 2 minutes.

Then, the mold was dipped, its fingertip side first, at a rate of 2 cm/s into the inner layer latex composition kept at a liquid temperature of 25° C. to a depth of 32.5 cm measured from the fingertip portion to the cuff portion of the mold, then kept in a dipped state for 10 seconds, and taken out, its cuff side first, at a rate of 2 cm/s, whereby a film of the inner layer latex composition was formed on the surface of the mold.

Subsequently, the mixed piles previously prepared were deposited in an amount of 1.6 mg/cm$^2$ on the film of the inner layer latex composition by the spraying process and the electrostatic deposition process, and then a gel-leaching treatment was carried out at 50° C. for 1 minute. In turn, the resulting mold was put in an oven heated to 125° C. for 30 minutes. Thus, the latex compositions were dried, and the natural rubber was vulcanized.

After the resulting mold was taken out of the oven and cooled to a room temperature, the resulting elastic glove was turned inside out and demolded so that a surface of the film flocked with the piles defined an interior surface of the elastic glove. Thus, the elastic glove was produced as having a double layer structure including an inner layer and an outer layer each made of the natural rubber with its interior surface flocked with the piles.

The inner layer had a thickness of 0.2 mm, and the outer layer had a thickness of 0.25 mm.

Example 2

An elastic glove was produced in substantially the same manner as in Example 1, except that mixed piles prepared so as to contain the water repellent piles in a proportion of 20 mass % based on the total amount of the hydrophilic piles and the water repellent piles by blending and mixing the hydrophilic piles H and the water repellent piles O together in a mass ratio of O/H=20/80 were used.

Example 3

An elastic glove was produced in substantially the same manner as in Example 1, except that mixed piles prepared so as to contain the water repellent piles in a proportion of 40 mass % based on the total amount of the hydrophilic piles and the water repellent piles by blending and mixing the hydrophilic piles H and the water repellent piles O together in a mass ratio of O/H=40/60 were used.

Example 4

An elastic glove was produced in substantially the same manner as in Example 1, except that mixed piles prepared so as to contain the water repellent piles in a proportion of 50 mass % based on the total amount of the hydrophilic piles and the water repellent piles by blending and mixing the hydrophilic piles H and the water repellent piles O together in a mass ratio of O/H=50/50 were used.

Example 5

An elastic glove was produced in substantially the same manner as in Example 1, except that mixed piles prepared so as to contain the water repellent piles in a proportion of 60 mass % based on the total amount of the hydrophilic piles and the water repellent piles by blending and mixing the hydrophilic piles H and the water repellent piles O together in a mass ratio of O/H=60/40 were used.

Example 6

An elastic glove was produced in substantially the same manner as in Example 1, except that mixed piles prepared so as to contain the water repellent piles in a proportion of 80 mass % based on the total amount of the hydrophilic piles and the water repellent piles by blending and mixing the hydrophilic piles H and the water repellent piles O together in a mass ratio of O/H=80/20 were used.

Comparative Example 1

An elastic glove was produced in substantially the same manner as in Example 1, except that the hydrophilic piles were used alone instead of the mixed piles. The proportion of the water repellent piles was 0 mass % based on the total amount of the hydrophilic piles and the water repellent piles.

Comparative Example 2

An elastic glove was produced in substantially the same manner as in Example 1, except that mixed piles prepared so as to contain the water repellent piles in a proportion of 90 mass % based on the total amount of the hydrophilic piles and the water repellent piles by blending and mixing the hydrophilic piles H and the water repellent piles O together in a mass ratio of O/H=90/10 were used.

Comparative Example 3

An elastic glove was produced in substantially the same manner as in Example 1, except that the water repellent piles were used alone instead of the mixed piles. The proportion of the water repellent piles was 100 mass % based on the total amount of the hydrophilic piles and the water repellent piles.

Evaluation

The interior surfaces of the gloves produced in Examples and Comparative Examples were each visually observed, and the gloves were each evaluated based on the following criteria for the uniformity of the pile embedded state in a fingertip portion, a palm portion and a cuff portion of the glove and in the entire glove. Gloves rated as 3 to 5 are acceptable, and gloves rated as 1 and 2 are unacceptable.
1: Bad
2: Poor
3: Standard level
4: Good
5: Excellent Further, the gloves produced in Examples and Comparative Examples were each evaluated based on the following criteria for the texture of the fingertip portion, the palm portion and the cuff portion of the glove observed when the glove was worn. Gloves rated as 3 to 5 are acceptable, and gloves rated as 1 and 2 are unacceptable.
1: Bad
2: Poor
3: Standard level
4: Good
5: Excellent The results are shown in Tables 3 and 4. In these tables, for example, an expression "4-5" means that the glove was rated as an intermediate between 4 and 5.

TABLE 3

|  | Comparative Example 1 | Example 1 | Example 2 | Example 3 | Example 4 |
|---|---|---|---|---|---|
| Water repellent piles (mass %) | 0 | 10 | 20 | 40 | 50 |
| Pile embedded state |  |  |  |  |  |
| Fingertip portion | 1 | 3 | 4 | 4-5 | 5 |
| Palm portion | 3 | 4 | 4-5 | 5 | 5 |
| Cuff portion | 5 | 4-5 | 4-5 | 4-5 | 4 |
| Overall | 3 | 4 | 4-5 | 4-5 | 4-5 |
| Texture |  |  |  |  |  |
| Fingertip portion | 1 | 3 | 4 | 4-5 | 4-5 |
| Palm portion | 2 | 4 | 4-5 | 5 | 4-5 |
| Cuff portion | 4 | 4 | 4 | 4 | 3-4 |

TABLE 4

|  | Example 5 | Example 6 | Comparative Example 2 | Comparative Example 3 |
|---|---|---|---|---|
| Water repellent piles (mass %) | 60 | 80 | 90 | 100 |
| Pile embedded state |  |  |  |  |
| Fingertip portion | 5 | 5 | 5 | 5 |
| Palm portion | 4-5 | 3-4 | 3 | 2 |
| Cuff portion | 3 | 3 | 2 | 1 |
| Overall Texture | 4 | 4 | 3-4 | 2-3 |
| Fingertip portion | 4-5 | 4-5 | 5 | 5 |
| Palm portion | 4 | 3-4 | 3 | 2 |
| Cuff portion | 3 | 3 | 2 | 1 |

The results of the evaluation of Examples 1 to 6 and Comparative Examples 1 to 3 in Tables 3 and 4 indicate that the hydrophilic piles and the water repellent piles should be used in combination as the piles to be flocked on the interior surface of the elastic glove and the proportion of the water repellent piles based on the total amount of the hydrophilic piles and the water repellent piles should be set within the range of not less than 10 mass % and not greater than 80 mass % in order to uniformize the pile embedded state over the substantially entire interior surface of the elastic glove and improve the texture.

The results of the evaluation of Examples 1 to 6 indicate that the proportion of the water repellent piles based on the total amount of the hydrophilic piles and the water repellent piles is preferably not less than 20 mass % and not greater than 50 mass % in the aforementioned range in order to further improve the aforementioned effects.

The invention claimed is:

1. A method of producing an elastic glove entirely made of rubber or resin and having an interior surface flocked with a multiplicity of piles, the method comprising the steps of:
   dipping a mold conformal to a three-dimensional shape of the elastic glove into an aqueous liquid latex composition containing the rubber or the resin, and taking out the mold to form a film of the latex composition defining at least the interior surface of the elastic glove on a surface of the mold; and
   depositing the piles on the film and then vulcanizing the rubber contained in the latex composition or curing or solidifying the resin contained in the latex composition;
   wherein hydrophilic piles and water repellent piles are used in combination as the piles, and the water repellent piles are present in a proportion of not less than 10 mass % and not greater than 80 mass % based on a total amount of the hydrophilic piles and the water repellent piles,
   wherein the water repellent piles are obtained by treating the hydrophilic piles with stearic acid, calcium stearate, wax or a silicone resin.

2. The elastic glove production method according to claim 1, wherein the proportion of the water repellent piles based on the total amount of the hydrophilic piles and the water repellent piles is not less than 20 mass % and not greater than 50 mass %.

3. The elastic glove production method according to claim 1, further comprising the step of: dipping the mold in a liquid latex composition containing rubber or resin, and then taking out the mold to form a film of the latex composition defining an exterior surface of the elastic glove on the surface of the mold before the formation of the film defining the interior surface of the elastic glove.

* * * * *